(12) United States Patent
Karamchedu et al.

(10) Patent No.: US 8,832,822 B2
(45) Date of Patent: Sep. 9, 2014

(54) SMART IDENTIFIERS

(75) Inventors: Murali M. Karamchedu, Beaverton, OR (US); Jeffrey B. Sponaugle, Tigard, OR (US)

(73) Assignee: Kryptiq Corporation, Hillsboro, OR (US)

(*) Notice: Subject to any disclaimer, the term of this patent is extended or adjusted under 35 U.S.C. 154(b) by 2210 days.

(21) Appl. No.: 11/625,057

(22) Filed: Jan. 19, 2007

(65) Prior Publication Data

US 2008/0177772 A1 Jul. 24, 2008

(51) Int. Cl.
*G06F 21/00* (2013.01)
*G06F 21/62* (2013.01)
*G06F 17/30* (2006.01)

(52) U.S. Cl.
CPC ...... *G06F 21/6209* (2013.01); *G06F 17/30011* (2013.01)
USPC .............................. 726/16; 726/19

(58) Field of Classification Search
CPC .................................. G06F 21/6209
USPC ..................................... 726/16, 19
See application file for complete search history.

(56) References Cited

U.S. PATENT DOCUMENTS

| | | | | |
|---|---|---|---|---|
| 7,200,585 | B2* | 4/2007 | Kinno et al. | 707/2 |
| 7,225,194 | B2* | 5/2007 | Muno et al. | 707/100 |
| 2004/0122851 | A1* | 6/2004 | Kinno et al. | 707/102 |
| 2004/0133890 | A1* | 7/2004 | Fukuda | 718/100 |
| 2005/0014494 | A1* | 1/2005 | Owen et al. | 455/419 |
| 2005/0027989 | A1* | 2/2005 | Sandhu et al. | 713/182 |
| 2005/0097234 | A1* | 5/2005 | Douglas et al. | 710/15 |
| 2005/0209880 | A1* | 9/2005 | Drelicharz et al. | 705/2 |
| 2005/0258238 | A1 | 11/2005 | Chapman | |
| 2006/0074889 | A1 | 4/2006 | Andrews et al. | |
| 2006/0218649 | A1 | 9/2006 | Brickell et al. | |
| 2007/0150299 | A1* | 6/2007 | Flory | 705/1 |
| 2007/0150862 | A1* | 6/2007 | Naibo et al. | 717/110 |
| 2007/0223694 | A1* | 9/2007 | Krzemienski | 380/229 |
| 2007/0299880 | A1* | 12/2007 | Kawabe et al. | 707/200 |
| 2009/0216831 | A1* | 8/2009 | Buckner | 709/202 |

FOREIGN PATENT DOCUMENTS

KR 10-2005-0101193 A 10/2005

OTHER PUBLICATIONS

Salton et al.; The SMART automatic document retrieval systems—an illustration; Magazine Communications of the ACM; CACM Homepage archive; vol. 8 Issue 6, Jun. 1965; pp. 391-398; ACM Digital Library.*

Bauer et al.; The object oriented document model of a meta system for existing digital libraries; Published in: Database and Expert Systems Applications, 2001. Proceedings. 12th International Workshop on; Date of Conference: 2001; pp. 933-936; IEEE Xplore.*

* cited by examiner

*Primary Examiner* — Bradley Holder
(74) *Attorney, Agent, or Firm* — Schwabe, Williamson & Wyatt, P.C.

(57) ABSTRACT

Embodiments of the present invention provide methods and apparatuses for providing unique smart identifiers for entities of various entity types, such as documents or portions thereof. Each smart identifier comprises one or more data values provided by a requester of the smart identifier, or data values derived there from. The generation may be entity type based and/or customized. Embodiments include registration of custom smart identifier generation functions, with particular parameter data value requirements for particular entity types. Embodiments include smart identifier requesters inquiring about, and receiving answers to parameter data values required to generate smart identifiers for entities of various entity types.

26 Claims, 5 Drawing Sheets

SMART IDENTIFIERS

TECHNICAL FIELD

Embodiments of the present invention relate to the field of data processing, and, in particular, to methods and apparatuses for providing unique smart identifiers for entities, such as documents or portions thereof, of a data processing system.

BACKGROUND

Advances in integrated circuit, microprocessor, networking and communication technologies, have led to increase sophistication in applying computing related technology to solve increasingly complex information management problems. For example, there has been an increased interest in applying computing related technology to health care information management to at least contain run away health care cost in industrialized nations like the United States.

Computing related applications often require assignment of identifiers to various information entities. For examples, in the case of health care information management, identifiers often have to be assigned to health care payers (insurance companies, health care maintenance organizations (HMO), etc.), health plans, heath care providers (clinics, doctors, nurses, etc.), patients, agreements or contracts between plans and provides, and so forth.

Prior art assignment methods often involve mere assignment of uninformative sequential identifiers, 12345, 12346, and so forth. Further, prior art assignment methods are often not customizable or extendable, without involving customized implementations by either the providers or the user enterprises of the information management software.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF ILLUSTRATIVE EMBODIMENTS OF THE INVENTION

Figure 1:
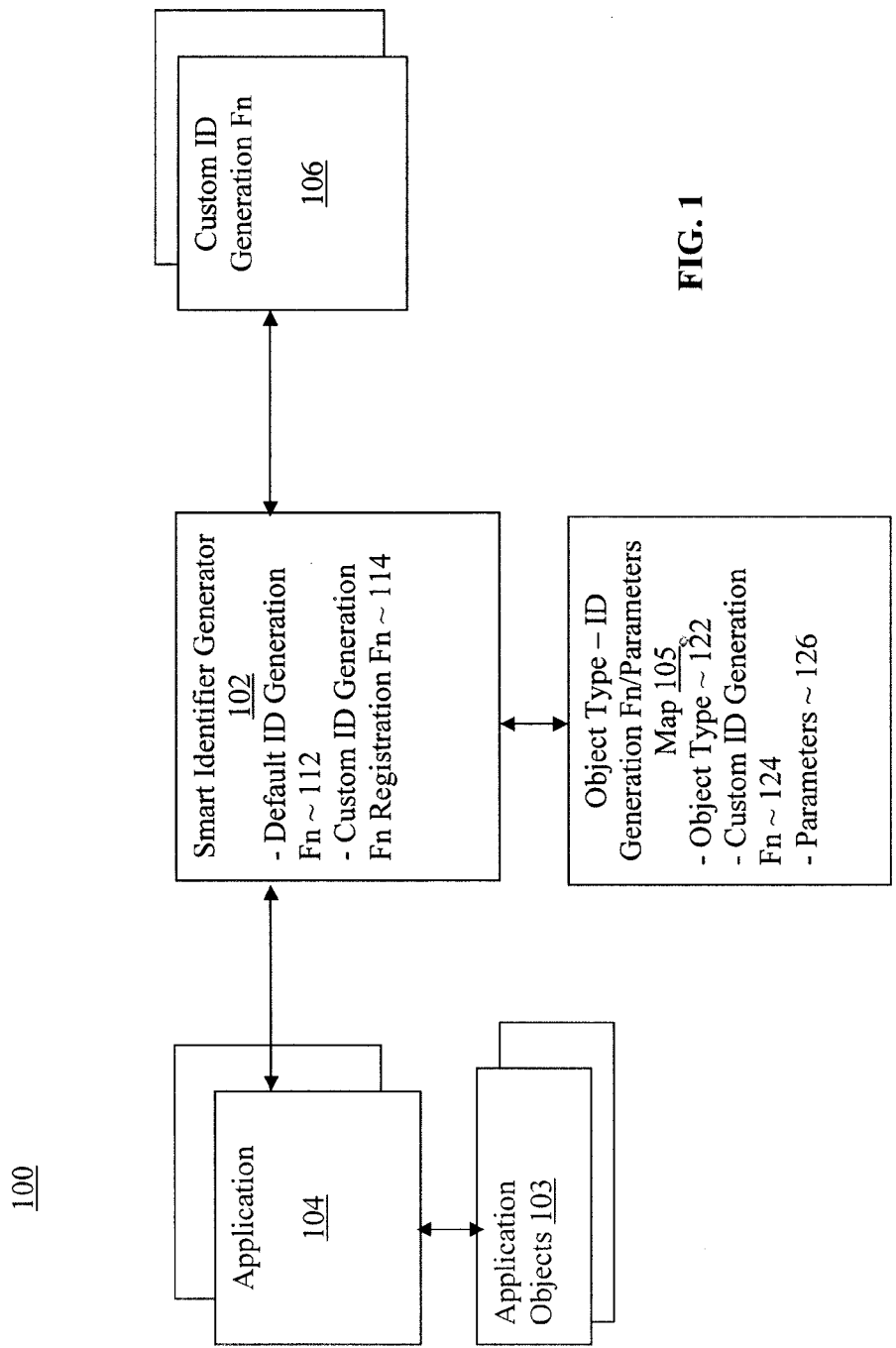
FIG. 1 illustrates an overview of the present invention, in accordance with various embodiments.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete steps in turn, in a manner that may be helpful in understanding embodiments of the present invention; however, the order of description should not be construed to imply that these operations are order dependent.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

The description may use perspective-based descriptions such as up/down, back/front, and top/bottom. Such descriptions are merely used to facilitate the discussion and are not intended to restrict the application of embodiments of the present invention.

For the purposes of the present invention, a phrase in the form "A/B" means A or B. For the purposes of the present invention, a phrase in the form "A and/or B" means "(A), (B), or (A and B)". For the purposes of the present invention, a phrase in the form "at least one of A, B, and C" means "(A), (B), (C), (A and B), (A and C), (B and C), or (A, B and C)". For the purposes of the present invention, a phrase in the form "(A)B" means "(B) or (AB)" that is, A is an optional element.

The description is presented, in part, in terms of operations performed by a processor based device, using terms such as receiving, determining, invoking, generating, returning, and the like, consistent with the manner employed by those skilled in the art. Quantities may take the form of electrical, magnetic, or optical signals capable of being stored, transferred, combined, and/or otherwise manipulated through mechanical, electrical and/or optical components of a processor based device.

Embodiments of the present invention provide for the creation and use of smart identifiers for identification of a variety of entities in a data processing environment. For the purposes of embodiments of the present invention, the terms "smart identifier" or "smart ID" refer to a unique identifier created to identify an entity, and which contains some deducible intelligence. For the purposes of embodiments of the present invention, the term "entity" refers to any digital entity/object to which a smart identifier may be associated, such as a data set, document, clause, term, image, etc. of a data processing system. For the purposes of embodiments of the present invention, the term "intelligence" refers to information that may be directly determined or derived from the smart ID other than a random quality or purely sequential aspect of the identifier. For example, a smart ID containing, in part, a document type identifier, such as "Contract," may be viewed and from which some information may be quickly and easily determined about the entity (i.e., the document is a contract). A smart identifier may be further contrasted with a dumb identifier that only contains arbitrary values, or simply provides sequential numbering, from which little or no quality of the entity or information associated with the entity may be determined from the identifier.

FIG. 1 illustrates an overview of the present invention in accordance with various embodiments. As illustrated, a computing environment 100, such as a computerized health care information management system, is enhanced with a smart identifier generator 102, incorporated with the teachings of present invention, for generating smart identifiers for identifying various data processing entities 103 (such as application objects). As described earlier, the smart identifiers are informative, containing information about the entities they identify. As will be described in more details below, in various embodiments, the smart identifiers contain information derived from or directly provided by requesters of the smart identifiers, such as applications 104 or other third party sources. Further, the smart identifiers may be customized, in particular, by the entities' entity types.

As illustrated, for the embodiments, smart identifier generator 102 is endowed with a default smart identifier generation function 112 for default (i.e. not customized) generation of smart identifiers. Further, for the embodiments, smart identifier generator is endowed with a custom smart identifier generation function registration function 114 for registering custom smart identifier generation functions 106 for customized generation of smart identifiers. In various embodiments, the customization is entity type based. That is, each custom smart identifier generation function 106 is designed to provide a customized smart identifier generation for entities of a particular entity type. Further, in various embodiments, each of the custom smart identifier generation functions 106 may specify the parameters to be employed for the corresponding generation of smart identifiers for entities of the entity type.

For the embodiments, smart identifier generator 102 tracks the customization, if any, in data processing environment 100, by maintaining an associated map 105 mapping entity types 122 to the registered customized smart identifier generation functions (106) 124, if any, and the parameters 126 to be employed for each of the customized smart identifier generation.

Accordingly, a provider or even a user enterprise of an information management software may easily customize and/or extend a basic smart identifier generation service provided by the information management software.

Figure 2:
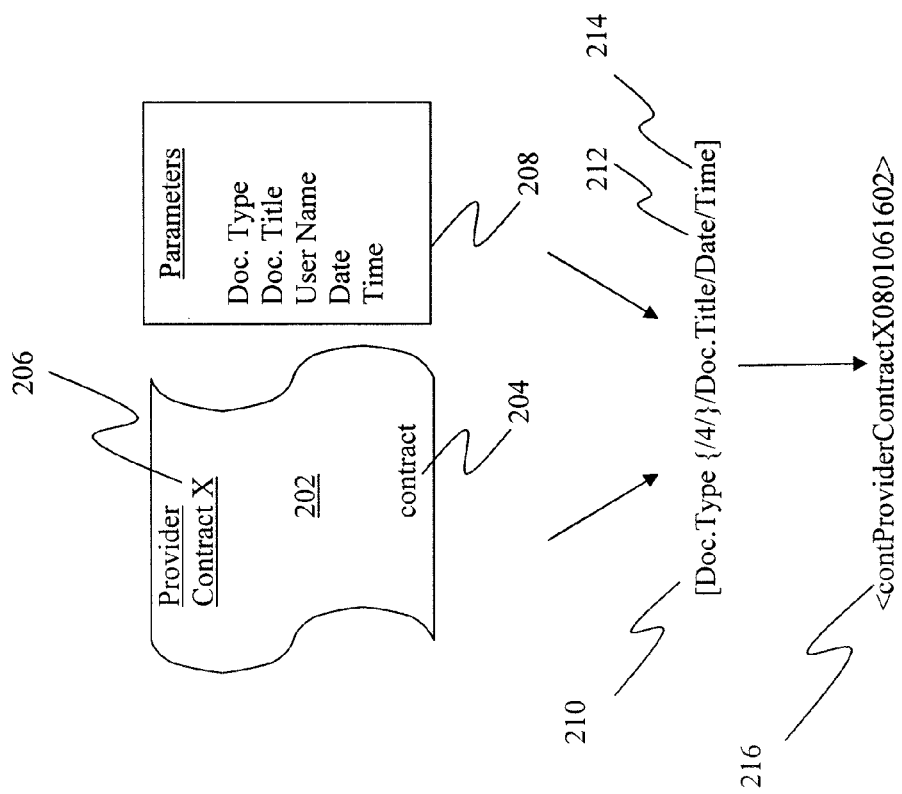
FIG. 2 illustrates an exemplary approach for creating a smart identifier in accordance with various embodiments of the present invention.

FIG. 2 shows an exemplary approach for creating a smart ID. An exemplary document 202 is shown having document type 204 and document title 206. In an embodiment, document type 204 may be visible on the document, or may be embedded or otherwise hidden from view. In an embodiment, a list of suitable parameters 208 may be employed in generating the smart identifiers for documents of "contract" type. Parameters 208 may include parameters directly associated with document 202 as well as other parameters indirectly or not associated with document 202. For the example, the parameters include Doc. Type, Doc. Title, User Name, Date, and Time. These parameters shown are for exemplary purposes only. In alternate embodiments, other parameters, especially for different entity types, may be employed. The values for such parameters, according to embodiments of the present invention, may be drawn from the entity itself or various associated modules or entities.

Still referring to FIG. 2, in various embodiments, a structure 210 may be employed to define the generation of a smart identifier, default or customized. For the embodiments, structure 210 defines the parameters to be employed to generate a smart identifier, as well as the order/placement of the parameters. Structure 210 may follow any of a variety of programming languages according to embodiments of the present invention.

In the illustrated example, the first representation (Doc.Type{/4/}) specifies the first four characters of the first parameter "Doc. Type" which results in the value "cont" are to be included in smart ID 216 in the leading positions. The value for the second parameter "Doc. Title" is included in its entirety as "ProviderContractX," following "Doc. Type", while the value for the parameter "User Name" is not included, since it is not included in the list of parameters in language 210. The last two parameter data values to be included in a smart identifier, following "Doc. Title", is date 212 and time 214, successively.

Smart ID 216 shows the output of the generation in accordance with structure 210 for data from document 202, and dynamic data 212 (date) and 214 (time). Using exemplary data, the date of Aug. 1, 2006, is shown in smart ID 216 as 080106, and the time of 4:02 pm is shown as 1602.

For the purposes of embodiments of the present invention, the term "parameter" refers to a category of data, such as document type, document title, version number, department (legal, accounting, etc.), user name, prescription type, doctor number, patient number, date, time, etc., whereas the term "data" refers to the value of the parameter. In an embodiment of the present invention, a parameter may be a random category to introduce an arbitrary value into a smart ID, as desired. As discussed above, the term "entity" refers to any entity/object to which a smart identifier may be associated, and, as such, the type of entity may be considered a category of the parameters from which a smart ID may be generated.

Figure 3:
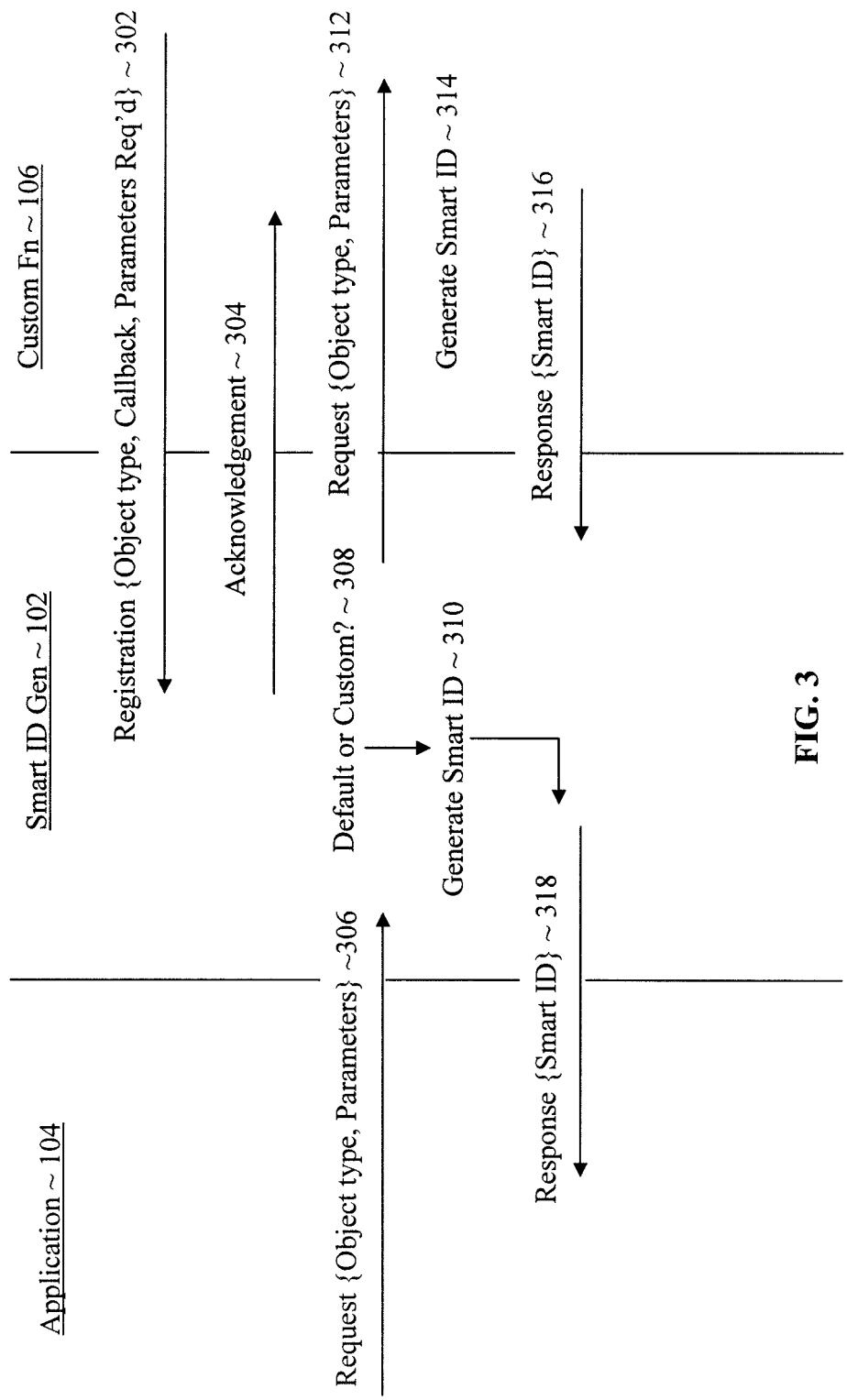
FIG. 3 illustrates in further detail communications between the applications, the smart identifier generator and the customized smart identifier generation functions of FIG. 1, in accordance with various embodiments of the present invention.

FIG. 3 illustrates in further detail communications between the applications 104, the smart identifier generator 102 and the customized smart identifier generation functions 106 of FIG. 1, in accordance with various embodiments of the present invention. As illustrated, for the embodiments, a custom smart identifier generation function first registers its presence with the smart identifier generator, 302 and 304. As alluded earlier, the registration may include the registering custom smart identifier generation function providing the smart identifier generator with a callback address or interface for invoking the registering custom smart identifier generation function. In various embodiments, the registration may further include the registering custom smart identifier generation function providing the smart identifier generator with an entity type of the entities for which the custom smart identifier generation function generates customized smart identifiers. The registration may also include the registering custom smart identifier generation function providing the smart identifier generator with a list of parameters for which data values are to be provided for the generation of the particular custom smart identifiers. Each registration may be effectuated through one or more rounds of conversation between a registering custom smart identifier generation function and the smart identifier generator.

As described earlier, in various embodiments, on registration, smart identifier generator saves the relevant information, i.e. the entity type for which the registered smart identifier generation function handles, the parameter data values required, and the callback address or interface. In various embodiments, the information is saved in an entity type to smart identifier generation function map.

Thereafter, an application may request the smart identifier generator to generate a smart identifier, 306, including a custom smart identifier to be generated by a registered custom smart identifier generation function. As described earlier, in various embodiments, the requestor application provides the parameter data values required.

In various embodiments, the requester application may not know exactly the parameter data values employed to generate a smart identifier for an entity, but proceed to provide a superset of parameter data values to the default/custom smart identifier generation function. In other embodiments, it is anticipated the smart identifier generator may be endowed to enable the requestor application to inquire about the parameter data values employed to generate a smart identifier for an entity of a particular entity type.

Note that the order is presented for ease of understanding only. While the invention provides for an administrator of a data process environment to extend the smart identifier generation capability provided by a software vendor, providing one or more custom smart identifier generation function of the administrator's desire, and the customization becomes effective only after the custom generation function has been provided/registered, the invention provides for a "fail soft" arrangement, where a requestor, by virtue of the default generation, will nonetheless receive a default smart identifier, if the request is made prior to customization.

Still referring to FIG. 3, as illustrated, for the embodiments, on receipt of a request to provide a smart identifier, the smart identifier generator determines whether it is to generate the requested smart identifier itself by default, or whether it is to invoke a registered custom smart identifier generation function to generate the requested smart identifier, 308. In various embodiments, the smart identifier generator accesses the earlier describer entity type—smart identifier generation function map to make the determination.

As illustrated, for the embodiments, on determination that the smart identifier generator is to generate the requested smart identifier itself by default, the smart identifier generator proceeds to generate the requested smart identifier, 310.

However, on determination that a custom smart identifier generation function is to be invoked to generate the requested smart identifier, smart identifier generator invokes the custom generation function, and provides the custom generation function with the required parameter data values (or one or more pointers to the parameter data values), 312. On invocation, the invoked custom generation function generates the custom smart identifier, 314, employing the provided parameter data values, retrieving them if necessary, and returns the generated custom smart identifier to the smart identifier generator, 316.

Whether generated itself by default or received from an invoked custom smart identifier generation function, in due course, the smart identifier generator returns the requested smart identifier to the requestor application, 318.

Figure 4:
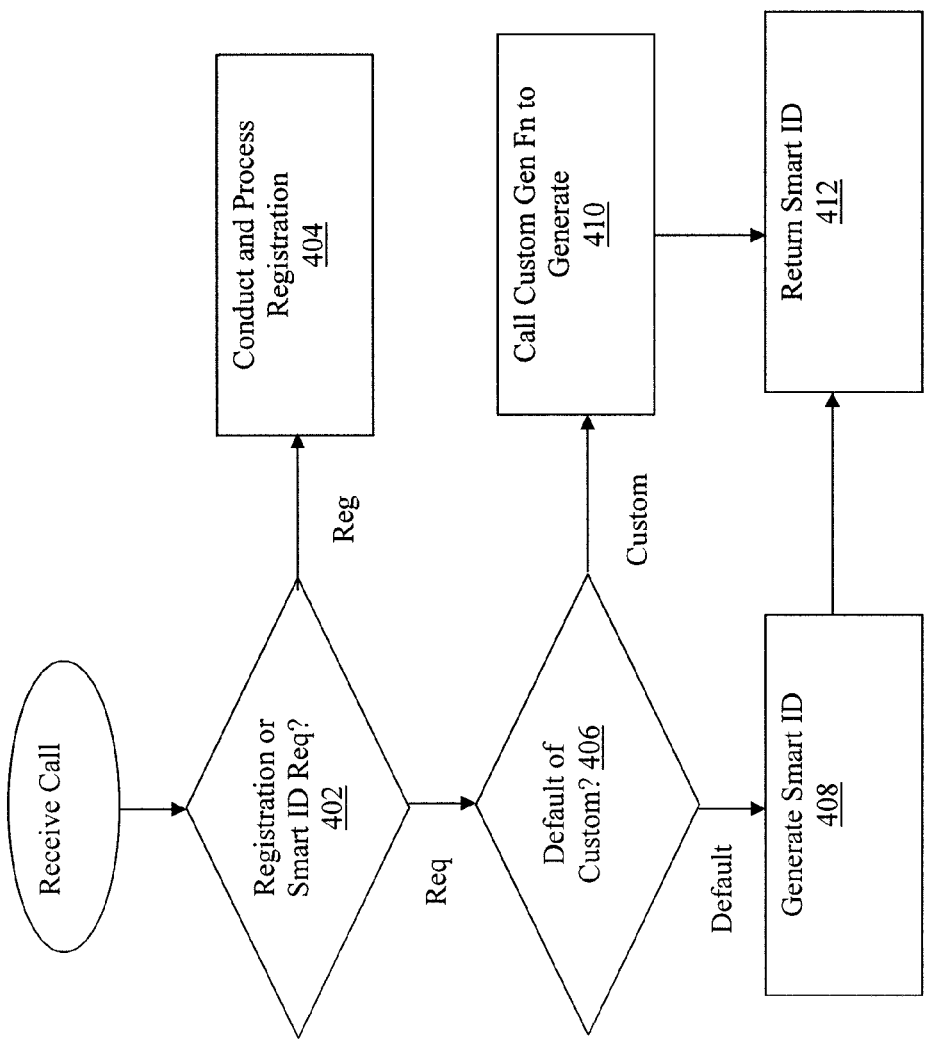
FIG. 4 illustrates selected operation flows of the smart identifier generator of FIG. 1, in accordance with various embodiments of the present invention.

FIG. 4 illustrates selected operation flows of the smart identifier generator of FIG. 1, in accordance with various embodiments of the present invention. As illustrated, on receipt of an input, the smart identifier generator determines whether the input is associated with a request to register a custom smart identifier generation from a custom smart identifier generation function, or a request to provide a smart identifier from a requester application, 402.

If the request is to register a custom smart identifier generation function, the smart identifier generator proceeds to register the custom smart identifier generation function, including obtaining the entity type the registering generation function is responsible for, and the parameter data values required by the registering generation, 404.

However, if the request is to generate a smart identifier, smart identifier generator proceeds to determine whether it is to generate the requested smart identifier itself or to invoke a registered custom smart identifier generation function to do so, 406. As described earlier, on determining that it is to generate the requested smart identifier itself, the smart identifier generator proceeds to generate the requested smart identifier accordingly, 408. However, on determining that it is to invoke a custom smart identifier generation function to generate the requested smart identifier, the smart identifier generator proceeds to invoke the appropriate custom smart identifier generation function accordingly, 410. In due course, the smart identifier generator returns the generated smart identifier to the requestor application, 412.

Figure 5:
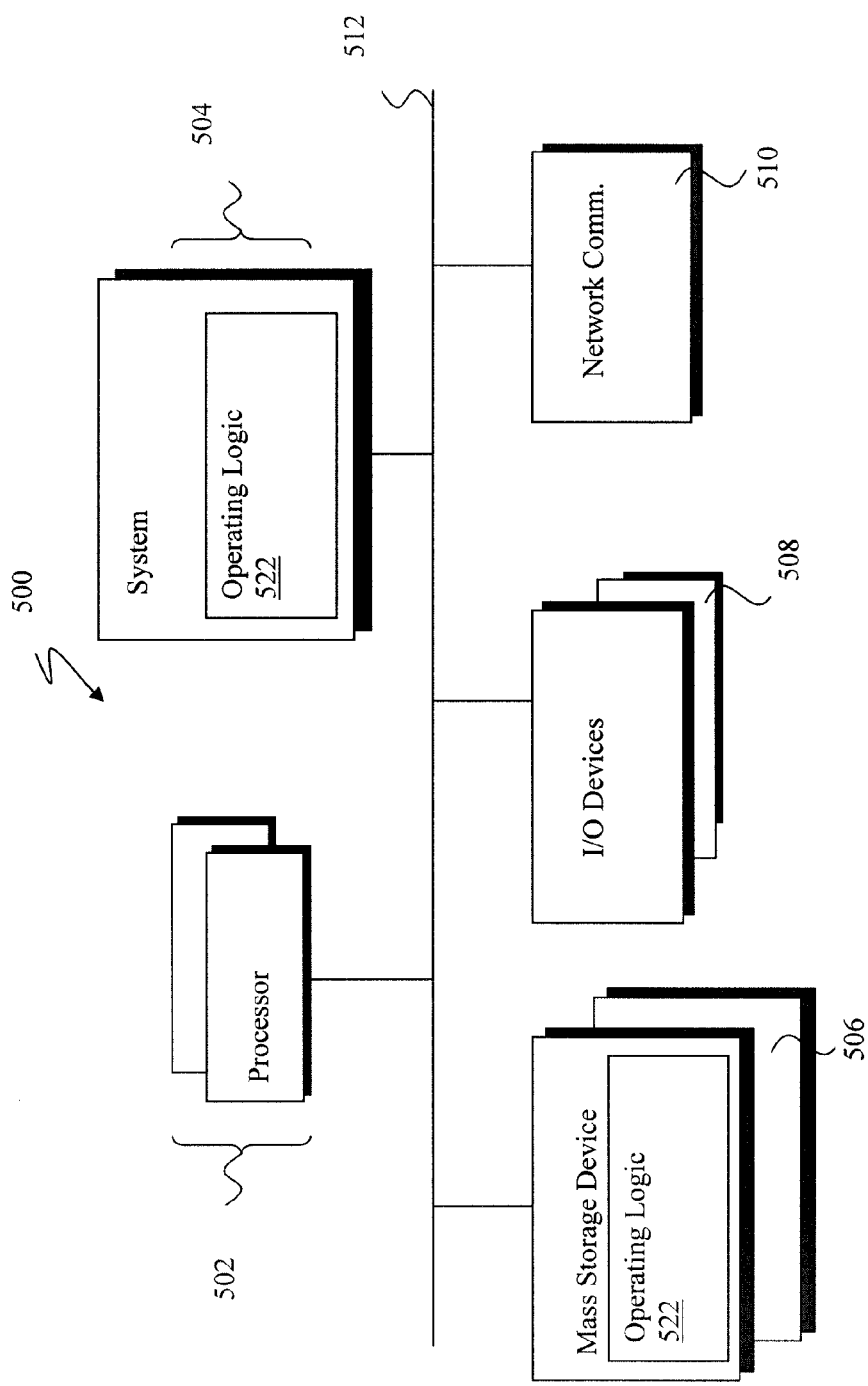
FIG. 5 illustrates an exemplary computing device suitable for practicing the invention, in accordance with various embodiments.

FIG. 5 illustrates an exemplary computing device suitable for practicing the invention, in accordance with various embodiments. As shown, computing system 500 includes a number of processors 502, and system memory 504. Additionally, computing system 500 includes mass storage devices 506 (such as diskette, hard drive, compact disc read only memory (CDROM) and so forth), input/output devices 508 (such as keyboard, cursor control and so forth) and communication interfaces 510 (such as network interface cards, modems and so forth). The elements are coupled to each other via system bus 512, which represents one or more buses. In the case of multiple buses, they are bridged by one or more bus bridges (not shown).

Each of these elements performs its conventional functions known in the art. In particular, system memory 504 and mass storage 506 may be employed to store a working copy and a permanent copy of the programming instructions implementing smart identifier generator 103 or selected aspects, herein collectively denoted as 522. The instructions 522 may be compiled from assembler instructions supported by processor(s) 502 or high level languages, such as C. In an embodiment, a system in accordance with an embodiment of the present invention may be implemented using object oriented programming language to define the module relationships, entity relationships, and/or communication protocols among the various modules.

The permanent copy of the programming instructions may be placed into permanent storage 506 in the factory, or in the field, through, for example, a distribution medium (not shown), such as a compact disc (CD), or through communication interface 510 (from a distribution server (not shown)).

The constitution of these elements 502-512 are known, and accordingly will not be further described.

In an embodiment, an exemplary system may be a health care contract management system. In such a system, a health care contract may be formed. In an embodiment in which a contract is formed (or a component of the contract, such as a term, rate, clause, document, etc.), a request may be made from the document creation module that a smart ID be provided for the contract. The request may be made to another module or sub-module (implementing the smart identifier generator earlier described) referred to hereafter as an identifier module.

In an embodiment of the present invention, the various modules may be maintained by a single party. In an alternate embodiment, one or more modules may be maintained by one or more additional parties. In an embodiment of the present invention, various modules may be implemented as business logic layers or as web services. For example, in an embodiment, the identifier module may be maintained by one party as an internal business logic layer within a document and/or contract management system. Alternatively, in an embodiment, the identifier module may be registered as a web service which provides a mechanism outside the document and/or contract management system to manage the generation of smart IDs.

In a further embodiment of the present invention using a web service, an exemplary method is provided below. When it is time to generate a smart ID for an entity, an application checks an internal registry for web services details of how to call a web service. Upon calling the web service, the application provides a variety of data to the web service that may be used to generate a smart ID. In response, the web service provides back a smart ID in accordance with the parameters and specific order defined in the web service.

In an embodiment, the application may be maintained and controlled by one party and the web service may be programmed and controlled by another party. In such an embodiment, the controlling party of the web service may specify the interface to the application and have the other party write to that specification to ensure compatibility.

In an embodiment, as a response to a request for a smart ID, the web service may return the structure (the order and specifics of the parameters) as well as the smart ID. One benefit of providing the structure is that the recipient of the structure then knows how to partition the smart ID, for example, to provide a visual representation of the different sections of the smart ID, such as by using underlining, highlighting, different fonts, different font sizes, different font colors, etc. In an embodiment, one benefit of such a system is that the system may be made flexible, which allows a user to format the user's smart IDs using a desired structure, even to conform the new smart IDs to a preexisting data structure.

In a situation in which the controlling party of the application has not predefined the parameters and/or the structure, but desires to know the parameters and/or the structure that comprise a particular smart ID, in an embodiment, returning the structure with the smart ID allows the structure to change from entity to entity while still providing the requisite information regarding the parameters and structure utilized.

In various embodiments, various aspects of the present invention may be implemented in discrete hardware or firmware. For example, one or more application specific integrated circuits (ASICs) may be programmed with one or more of the above-described functions of the embodiments of the present invention. In another example, one or more functions of the embodiments of the present invention may be implemented in one or more ASICs on additional circuit boards and the circuit boards may be inserted into one or more computers. In another embodiment of the present invention, programmable gate arrays may be used to implement one or more functions of embodiments of the present invention. In another embodiment of the present invention, a combination of hardware and software may be used to implement one or more functions of embodiments of the present invention.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A computer implemented method, comprising:
   receiving by a smart identifier generator operating on a computing device, from a requestor, a request to generate a smart identifier for an entity, the request including one or more data values for one or more parameters;
   generating or causing to be generated by the smart identifier generator, the requested smart identifier comprising one or more of the data values or derivative data values derived from one or more of the data values;
   returning or causing to be returned, by the smart identifier generator, the generated smart identifier to the requestor;
   wherein the entity has an entity type; the request includes the entity type; the one or more data values are for one or more parameters associated with the entity type, and the generating or causing to be generated are based at least in part on the entity type; and
   the method further comprises
   receiving by the smart identifier generator, from a custom smart identifier generation function, a registration to register the custom smart identifier generation function to handle generation of smart identifiers for entities of an entity type, and
   registering the custom smart identifier generation function, by the smart identifier generator, based at least in part on the received registration.

2. The method of claim 1, wherein said receiving of a request comprises receiving a request by the smart identifier generator from an application.

3. The method of claim 1, wherein said receiving of a request comprises receiving a request by the smart identifier generator to generate a smart identifier for a document or a portion of a document, the request including an entity type identifying the smart identifier requested is for a document type or a document portion type.

4. The method of claim 3, wherein the request is for a document and the document type is an image.

5. The method of claim 3, wherein the request is for a document, and the request further includes one or more data values associated with one or more document parameters, selected from a document title parameter, a document version number parameter, a department identifier parameter, a user name parameter, a doctor identifier parameter, a patient number parameter, a date parameter, or a time parameter.

6. The method of claim 3, wherein the request is for a document portion, and the request includes an entity type identifying the document portion as a clause, a term, or a rate of a document.

7. The method of claim 1, wherein the registration includes one or more parameter data values required by the custom smart identifier generation function to generate a smart identifier for an entity of the entity type.

8. The method of claim 1, further comprising determining by the smart identifier generator, on receipt of a request to generate a smart identifier, whether a registered custom smart identifier generation function is to be invoked to generate the requested smart identifier.

9. The method of claim 8, wherein said causing or causing to be generated comprises the smart identifier generator, on determining a registered custom smart identifier generation function is to be invoked to generate the requested smart identifier, invoking the registered custom smart identifier generation function.

10. The method of claim 9, further comprising the smart identifier generator receiving the requested smart identifier from the invoked custom smart identifier generation function; and said returning or causing to be returned comprises the smart identifier generator returning the received requested smart identifier to the requestor.

11. The method of claim 8, wherein said causing or causing to be generated comprises the smart identifier generator, on determining no registered custom smart identifier generation function is to be invoked to generate the requested smart identifier, generating the smart identifier.

12. The method of claim 11, wherein said generating comprises deriving one or more derivative data values based on one or more of the data values, and concatenating the one or more derived data values with another one or more of the data values to form the smart identifier.

13. The method of claim 1, further comprising the smart identifier generator receiving an inquiry from the requestor with respect to parameter data values required to generate a smart identifier for an entity of an entity type; and the smart identifier generator replying to the inquiry with parameters requiring data values.

14. An article of manufacturing comprising:
a non-transitory storage medium; and
a plurality of programming instructions stored in the storage medium, the programming instructions, when executed by a processor of a computing device, is designed to implement a smart identifier generator on the computing device, the smart identifier generator adapted to receive from a requestor a request to generate a smart identifier for an entity, the request including an entity type of the entity, generate or cause to be generated the requested smart identifier based at least in part on the entity type, return or cause to be returned the generated smart identifier to the requestor, receive from a custom smart identifier generation function a registration to register the custom smart identifier generation function to handle generation of smart identifiers for entities of an entity type, and register the custom smart identifier generation function based at least in part on the received registration.

15. The article of claim 14, wherein the registration includes one or more parameter data values required by the custom smart identifier generation function to generate a smart identifier for an entity of the entity type.

16. The article of claim 14, wherein the smart identifier generator is further adapted to determine, on receipt of a request to generate a smart identifier, whether a registered custom smart identifier generation function is to be invoked to generate the requested smart identifier.

17. The article of claim 16, wherein the smart identifier generator is further adapted to generating the smart identifier, on determining no registered custom smart identifier generation function is to be invoked to generate the requested smart identifier.

18. The article of claim 17, wherein the smart identifier generator is further adapted to receive an inquiry from the requestor with respect to parameter data values required to generate a smart identifier for an entity of an entity type; and to reply to the inquiry with parameters requiring data values.

19. An apparatus comprising:
one or more hardware processors; and
a non-transitory storage medium coupled to the one or more hardware processors, the storage medium having stored therein a plurality of programming instructions to be executed by the one or more hardware processors, the programming instructions designed to implement a smart identifier generator, and the smart identifier generator adapted to receive from a requestor a request to generate a smart identifier for entity, the request including an entity type of the entity and one or more data values for one or more parameters associated with the entity type, generate or cause to be generated the requested smart identifier based at least in part on the entity type and having at least one or more of the data values or one or more derivative data values derived from one or more of the data values, return or cause to be returned the generated smart identifier to the requestor, receive from a custom smart identifier generation function a registration to register the custom smart identifier generation function to handle generation of smart identifiers for entities of an entity type, and register the custom smart identifier generation function based at least in part on the received registration.

20. The apparatus of claim 19, wherein the registration includes one or more parameter data values required by the custom smart identifier generation function to generate a smart identifier for an entity of the entity type.

21. The apparatus of claim 19, wherein the smart identifier generator is further adapted to determine, on receipt of a request to generate a smart identifier, whether a registered custom smart identifier generation function is to be invoked to generate the requested smart identifier.

22. The apparatus of claim 19, wherein the smart identifier generator is further adapted to generate the smart identifier, on determining no registered custom smart identifier generation function is to be invoked to generate the requested smart identifier.

23. The apparatus of claim 22, wherein said generating comprises deriving one or more derivative data values based on one or more of the data values, and concatenating the one or more derived data values with another one or more of the data values to form the smart identifier.

24. The apparatus of claim 19, wherein the smart identifier generator is further adapted to receive an inquiry from the requestor with respect to parameter data values required to generate a smart identifier for an entity of an entity type; and to reply to the inquiry with parameters requiring data values.

25. The apparatus of claim 19, wherein the apparatus is a server, and the requestor is an application executing on a client device communicatively coupled to the server.

26. The apparatus of claim 19, wherein the programming instructions are designed to implement a health care information system including the smart identifier generator.

* * * * *